(No Model.)
J. R. B. HUNT.
SAW GUMMER.
No. 324,380. Patented Aug. 18, 1885.
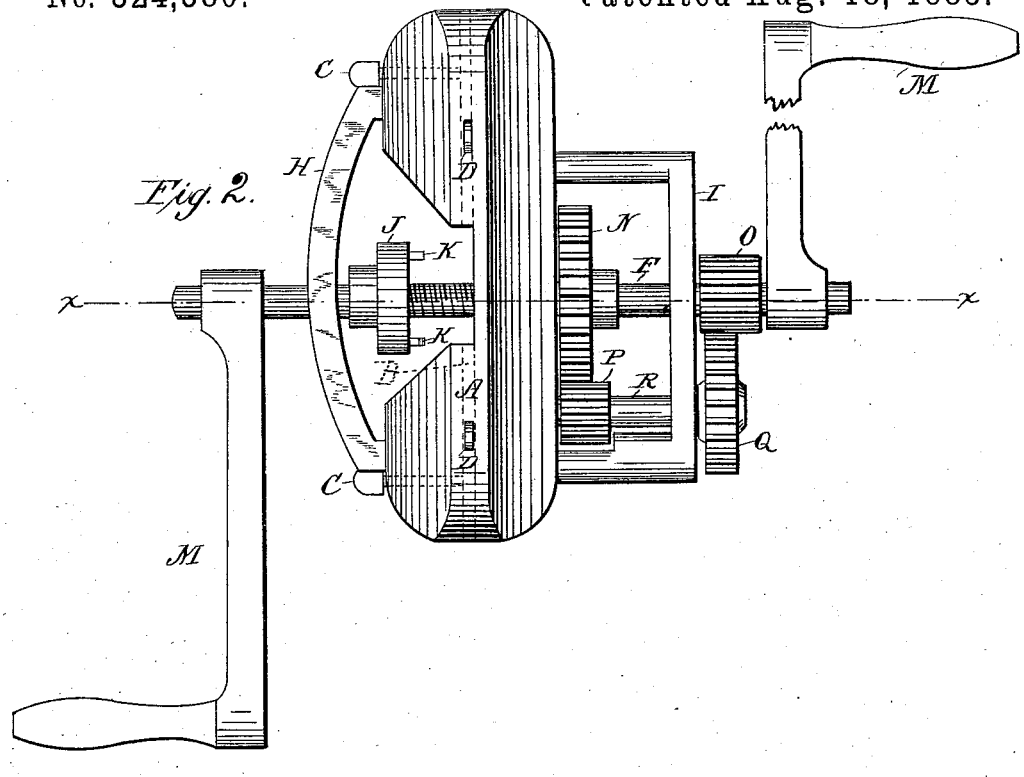
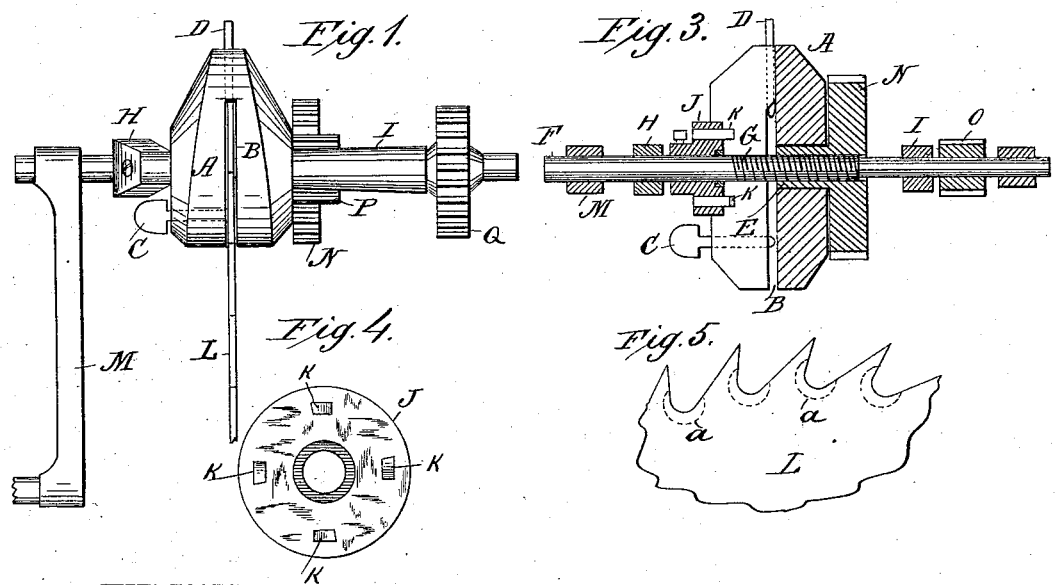
WITNESSES:
W. W. Hollingsworth
A. G. Lyne.
INVENTOR:
J. R. B. Hunt
BY Munn & Co.
ATTORNEYS.

UNITED STATES PATENT OFFICE.

JAMES R. B. HUNT, OF NORTH TROY, VERMONT, ASSIGNOR OF ONE-HALF TO ORION N. ELKINS, OF SAME PLACE.

SAW-GUMMER.

SPECIFICATION forming part of Letters Patent No. 324,380, dated August 18, 1885.

Application filed June 6, 1884. (No model.)

*To all whom it may concern:*

Be it known that I, JAMES R. B. HUNT, of North Troy, in the county of Orleans and State of Vermont, have invented a new and useful Improvement in Saw-Gummers, of which the following is a full, clear, and exact description, reference being had to the annexed drawings, forming part of this specification.

The object of this invention is to provide an improvement in that class of saw-gummers by which a cutter-head or device for cutting out the throat of a saw-tooth may be operated against the side of a saw instead of against the edge, to the end that the operation of gumming a saw may be done quickly and without danger of drawing the temper of the saw-plate.

In the drawings, Figure 1 is a side elevation of my saw-gummer. Fig. 2 is a plan view of the same. Fig. 3 is a section on line $x$ $x$ of Fig. 2, and Figs. 4 and 5 are detail views.

A indicates a saw-clamp, consisting of a block which is cut away at one side near its longitudinal center to allow the cutter-head to have access to the saw-teeth. This block is provided with a slot, B, extending through its ends to receive the saw, and set-screws C in said ends to hold the saw-blade, and set-screws D, arranged at right angles to the screws C and adapted to engage the saw by its teeth, to assist in holding it firmly in position during the operation of gumming.

Transversely through the center of the block A is arranged an internally-threaded sleeve, E, and in the sleeve is arranged a shaft, F, having a threaded portion, G, which screws into the sleeve. The ends of this shaft are supported in brackets H I, which are attached to the block A.

On the shaft F is secured a cutter-head, J, having a number of cutters or chisels, K, which, with the head J, are fed against the saw-blade L to cut out the throat of the tooth on the dotted line $a$ in Fig. 5. The shaft is operated by one or more cranks, M.

The sleeve E is provided with a gear-wheel, N, and the shaft F with a pinion, O, which engage with a pinion, P, and gear-wheel Q, respectively, which are secured on a shaft, R, arranged parallel with the shaft F. The object of the gearing is to regulate the feed of the cutter-head by giving the sleeve E a motion in the same direction as that of the shaft F, but at a less rate of speed.

I am aware that the shafts of saw-gummers of this class have been fed or caused to advance while being rotated to revolve the cutting-tool, and I therefore restrict my claim accordingly.

What I claim is—

1. The combination, with the slotted clamp and a screw-threaded sleeve which is fixed as to longitudinal movement, of the screw-threaded shaft working therein, and having the cutter-head fixed thereon, substantially as shown and described, whereby the rotation of said shaft not only revolves the cutter-head, but advances it against the saw, as specified.

2. The combination of the clamp, an internally-threaded sleeve therein, the shaft having a cutter-head secured thereto, which shaft screws into said sleeve, and the system of gears connected with said shaft for regulating the action of the same, substantially as shown and described.

JAMES R. B. HUNT.

Witnesses:
A. J. WELCH,
T. C. CALL.